(12) United States Patent
Hamada et al.

(10) Patent No.: US 12,409,847 B2
(45) Date of Patent: Sep. 9, 2025

(54) INFORMATION PROCESSING DEVICE

(71) Applicant: TOYOTA JIDOSHA KABUSHIKI KAISHA, Toyota (JP)

(72) Inventors: Hiroto Hamada, Miyoshi (JP); Miki Tsujino, Nagakute (JP); Masashi Hatanaka, Toyota (JP); Makoto Konishi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 18/510,221

(22) Filed: Nov. 15, 2023

(65) Prior Publication Data
US 2024/0270272 A1 Aug. 15, 2024

(30) Foreign Application Priority Data
Feb. 13, 2023 (JP) ................. 2023-020280

(51) Int. Cl.
*B60W 50/14* (2020.01)
*B60W 40/105* (2012.01)
(Continued)

(52) U.S. Cl.
CPC .......... *B60W 50/14* (2013.01); *B60W 40/105* (2013.01); *G01S 13/931* (2013.01);
(Continued)

(58) Field of Classification Search
CPC ............... B60W 50/14; B60W 40/105; B60W 2554/4041; B60W 2556/50; B60W 2554/4044; B60W 2554/4045; B60W 2420/408; B60W 2050/146; B60W 2420/403; G06V 20/58; G01S 13/931; B60K 2360/195; B60K 35/28; B60K 2360/171; B60K 35/29
See application file for complete search history.

(56) References Cited

U.S. PATENT DOCUMENTS 9,849,784 B1 * 12/2017 Chan ................. G01C 21/3697
2002/0169548 A1 * 11/2002 Kuroda ................ G01C 21/367
340/995.23

(Continued)

FOREIGN PATENT DOCUMENTS

JP 7086798 B2 6/2022
WO 2020/031912 A1 2/2020

OTHER PUBLICATIONS

Office Action issued to U.S. Appl. No. 18/504,556 on Apr. 8, 2025.
(Continued)

*Primary Examiner* — Chico A Foxx
(74) *Attorney, Agent, or Firm* — SoraIP, Inc.

(57) ABSTRACT

The information processing device includes a target unit. When a target object existing in a traveling direction of a vehicle traveling on a road is detected by a detection unit, and it is assumed that a positional relationship between the vehicle and the target object is in a predetermined state, and the target object crosses the road, the control unit displays a target object image showing the target object at a position reflecting the actual position of the target object in the road image showing the road displayed on the display unit in the vehicle.

4 Claims, 4 Drawing Sheets

(51) Int. Cl.
*G01S 13/931* (2020.01)
*G06V 20/58* (2022.01)
*B60K 35/28* (2024.01)
*B60K 35/29* (2024.01)

(52) U.S. Cl.
CPC .............. *G06V 20/58* (2022.01); *B60K 35/28* (2024.01); *B60K 35/29* (2024.01); *B60K 2360/171* (2024.01); *B60K 2360/195* (2024.01); *B60W 2050/146* (2013.01); *B60W 2420/403* (2013.01); *B60W 2420/408* (2024.01); *B60W 2554/4041* (2020.02); *B60W 2554/4044* (2020.02); *B60W 2554/4045* (2020.02); *B60W 2556/50* (2020.02)

(56) References Cited

U.S. PATENT DOCUMENTS

| | | | |
|---|---|---|---|
| 2010/0123778 A1 | 5/2010 | Hada | |
| 2015/0070158 A1* | 3/2015 | Hayasaka | G01S 7/22 |
| | | | 340/438 |
| 2015/0091740 A1* | 4/2015 | Bai | B60K 35/00 |
| | | | 340/901 |
| 2015/0116494 A1* | 4/2015 | Esaka | B60R 11/04 |
| | | | 348/148 |
| 2017/0057497 A1* | 3/2017 | Laur | G06V 20/58 |
| 2017/0160392 A1* | 6/2017 | Brisimitzakis | G01S 7/24 |
| 2017/0307749 A1* | 10/2017 | Shimizu | G08G 1/166 |
| 2018/0090007 A1* | 3/2018 | Takemori | G06V 20/20 |
| 2020/0005637 A1 | 1/2020 | Walker et al. | |
| 2020/0079379 A1 | 3/2020 | Mimura | |
| 2020/0142042 A1* | 5/2020 | Hibino | G01S 17/42 |
| 2021/0347259 A1 | 11/2021 | Shibata et al. | |
| 2023/0306752 A1* | 9/2023 | Horiuchi | G06V 10/95 |
| 2023/0311656 A1* | 10/2023 | Yasui | B60K 35/29 |
| | | | 701/36 |
| 2024/0270271 A1 | 8/2024 | Hamada et al. | |
| 2024/0273750 A1 | 8/2024 | Hamada et al. | |

OTHER PUBLICATIONS

Hiroto Hamada et al., U.S. Appl. No. 18/504,556, filed Nov. 8, 2023 (Published as US2024/0270271A1).

Hiroto Hamada et al., U.S. Appl. No. 18/428,057, filed Jan. 31, 2024 (Published as US2024/0273750A1).

* cited by examiner

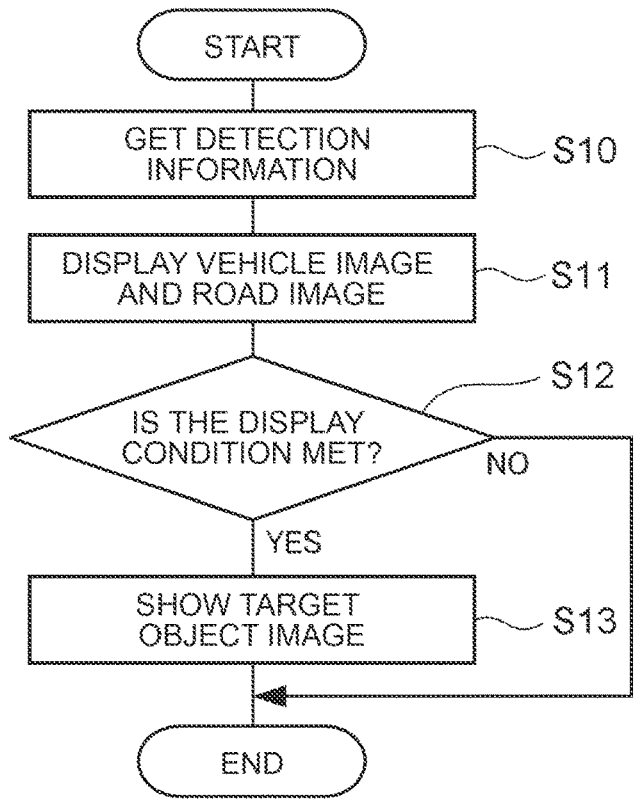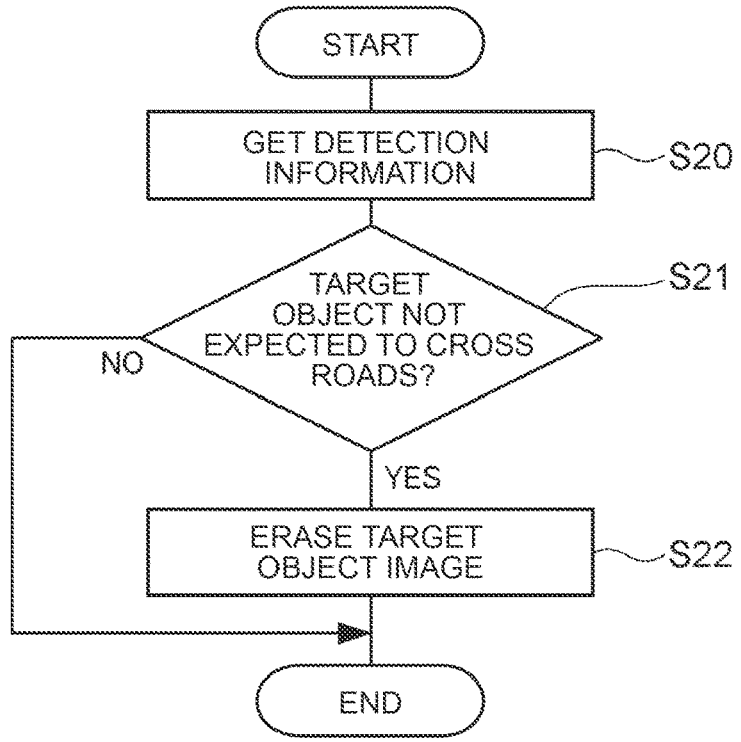

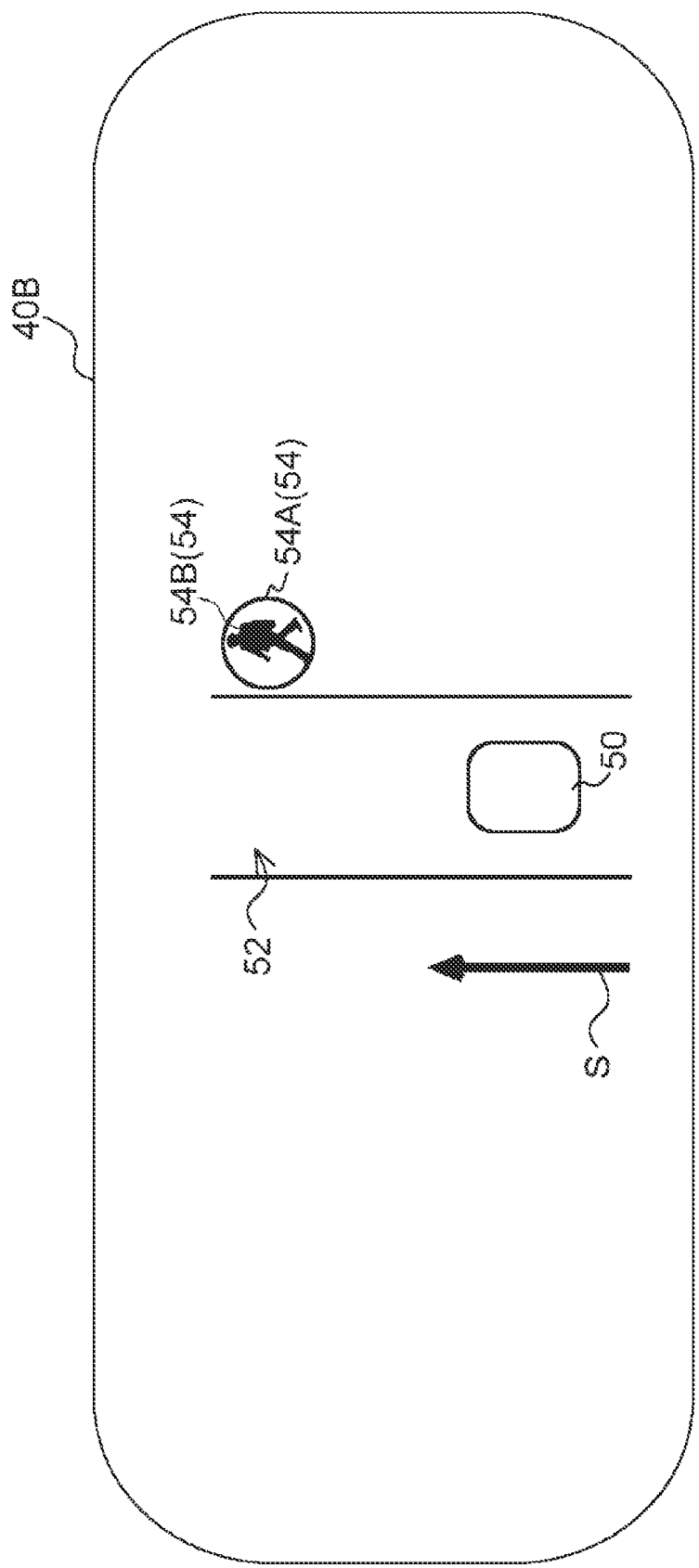

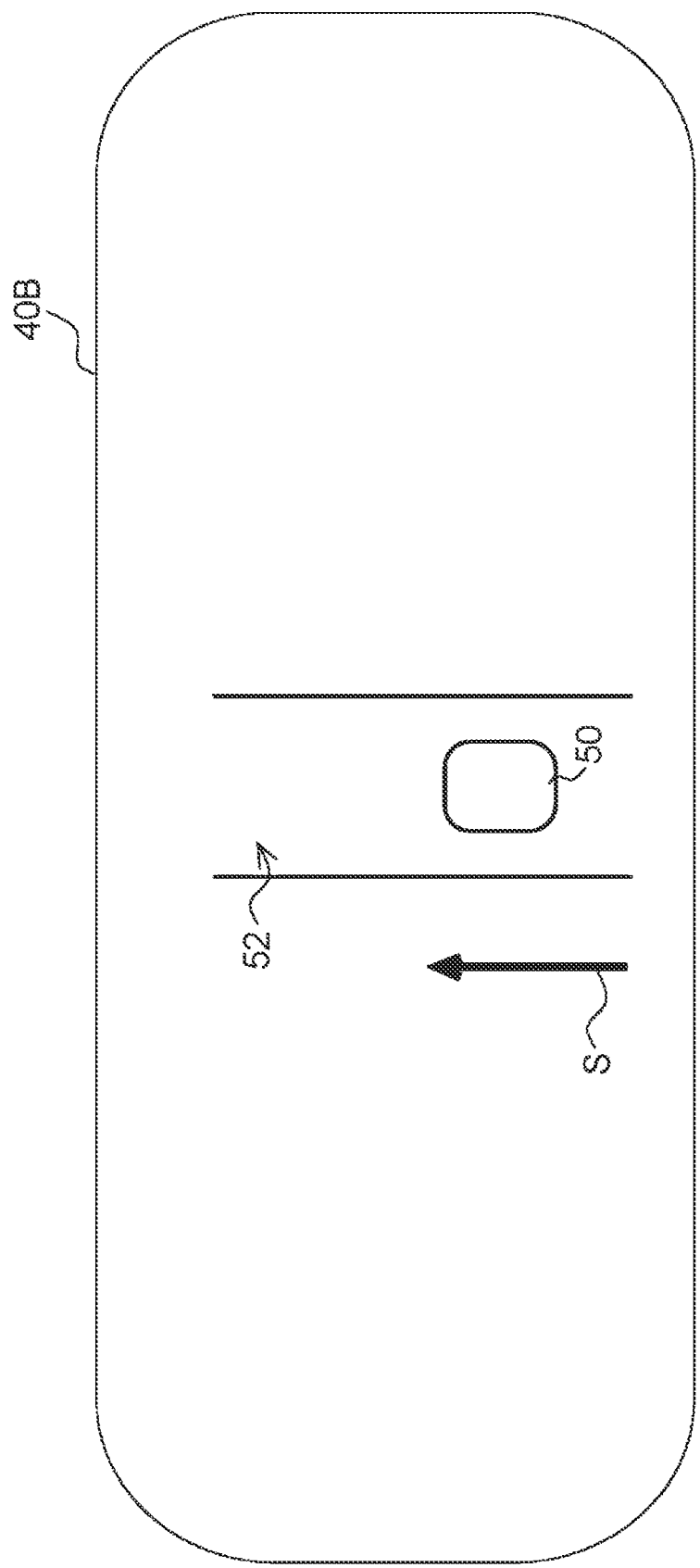

INFORMATION PROCESSING DEVICE

CROSS-REFERENCE TO RELATED APPLICATION

This application claims priority to Japanese Patent Application No. 2023-020280 filed on Feb. 13, 2023, incorporated herein by reference in its entirety.

BACKGROUND

1. Technical Field

The present disclosure relates to an information processing device.

2. Description of Related Art

WO2020/031912 discloses a technology for enabling an occupant to clearly view a target object present outside a vehicle.

SUMMARY

In the technology of WO2020/031912, target object-related information indicating the target object is displayed on a head-up display (HUD). However, there is room for improvement in terms of display contents of an in-vehicle display for the occupant to grasp the target object present outside the vehicle.

Accordingly, an object of the present disclosure is to provide an information processing device capable of displaying, on an in-vehicle display, contents related to the possibility that a target object will actually cross a road.

An information processing device according to one aspect includes a control unit configured to, when a target object present in a traveling direction of a vehicle traveling on a road is detected by a detection unit, a positional relationship between the vehicle and the target object is in a predetermined state, and the target object is expected to cross the road, display a target object image showing the target object at a position reflecting an actual position of the target object in a road image showing the road and displayed on a display unit in the vehicle.

In the information processing device according to the above aspect, when the target object is detected by the detection unit, the positional relationship between the vehicle and the target object is in the predetermined state, and the target object is expected to cross the road, the control unit displays the target object image at the position reflecting the actual position of the target object in the road image. As a result, the information processing device displays the target object image on the condition that the target object is expected to cross the road. Thus, the contents related to the possibility that the target object will actually cross the road can be displayed on the in-vehicle display.

In the information processing device according to the above aspect, the target object may be expected to cross the road when an actual direction of the target object is a direction toward the road.

In the information processing device according to the above aspect, the target object is expected to cross the road when the actual direction of the target object is the direction toward the road. Thus, the information processing device can determine the possibility that the target object will cross the road based on the actual direction of the target object, and can perform control as to whether to display the target object image.

In the information processing device according to the above aspect, the control unit may be configured to display the target object image reflecting the actual direction of the target object.

In the information processing device according to the above aspect, the control unit displays the target object image reflecting the actual direction of the target object. Thus, in the information processing device, the occupant can grasp the actual direction of the target object by viewing the display unit.

In the information processing device according to the above aspect, the control unit may be configured to erase the target object image from the display unit when the target object is no longer expected to cross the road after the target object image is displayed.

In the information processing device according to the above aspect, the control unit erases the target object image from the display unit when the target object is no longer expected to cross the road after the target object image is displayed. Thus, the information processing device can reduce the amount of information to be displayed on the display unit when the target object is no longer expected to cross the road.

In the information processing device according to the above aspect, the control unit may be configured to display a vehicle image showing the vehicle at a position reflecting an actual position of the vehicle in the road image.

In the information processing device according to the above aspect, the control unit displays the vehicle image at the position reflecting the actual position of the vehicle in the road image. Thus, in the information processing device, the occupant can grasp the positional relationship between the vehicle and the target object by viewing the display unit.

As described above, in the information processing device according to the present disclosure, it is possible to display, on the in-vehicle display, the contents related to the possibility that the target object will actually cross the road.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 is a first flowchart showing the flow of control processing;

FIG. 4 is a second flowchart showing the flow of control processing;

FIG. 5 is a first explanatory diagram showing a display example displayed on the display unit while the vehicle is running; and FIG. 6 is a second explanatory diagram showing a display example displayed on the display unit while the vehicle is running.

DETAILED DESCRIPTION OF EMBODIMENTS

A vehicle 10 according to this embodiment will be described. The vehicle 10 may be an engine vehicle, a hybrid electric vehicle, or a battery electric vehicle, but in the present embodiment, the vehicle 10 is an engine vehicle as an example.

Figure 1:
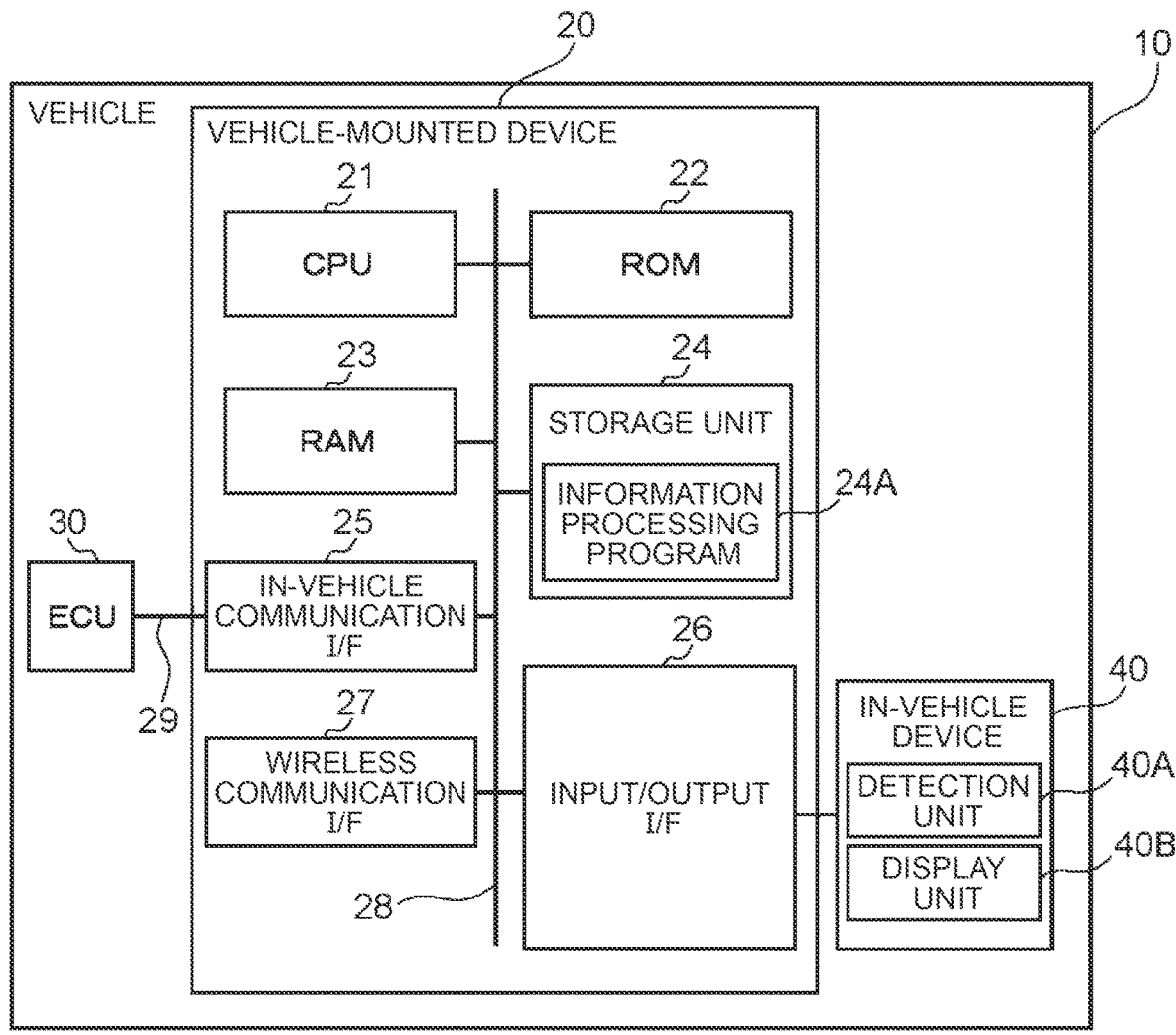
FIG. 1 is a block diagram showing the hardware configuration of a vehicle.

FIG. 1 is a block diagram showing the hardware configuration of the vehicle 10. As shown in FIG. 1, the vehicle 10 includes a vehicle-mounted device 20, an Electronic Control Unit (ECU) 30 and an in-vehicle device 40. The vehicle-mounted device 20 is an example of an "information processing device".

The vehicle-mounted device 20 includes a Central Processing Unit (CPU) 21, a Read Only Memory (ROM) 22, a Random Access Memory (RAM) 23, a storage unit 24, an in-vehicle communication Interface (I/F) 25, and an input/output I/F 26, and wireless communication I/F 27. The CPU 21, ROM 22, RAM 23, storage unit 24, in-vehicle communication I/F 25, input/output I/F 26, and wireless communication I/F 27 are connected via an internal bus 28 so as to be able to communicate with each other.

The CPU 21 is a central processing unit that executes various programs and controls each section. That is, the CPU 21 reads a program from the ROM 22 or the storage unit 24 and executes the program using the RAM 23 as a work area. The CPU 21 performs control of the above components and various arithmetic processing according to programs recorded in the ROM 22 or the storage unit 24.

The ROM 22 stores various programs and various data. RAM 23 temporarily stores programs or data as a work area.

The storage unit 24 is configured by a storage device such as an embedded Multi Media Card (eMMC) or Universal Flash Storage (UFS), and stores various programs and various data. The storage unit 24 stores an information processing program 24A for causing the CPU 21 to execute control processing, which will be described later.

The in-vehicle communication I/F 25 is an interface for connecting with the ECU 30. The interface uses a communication standard based on the CAN protocol. In-vehicle communication I/F 25 is connected to external bus 29. Although not shown, a plurality of ECUs 30 is provided for each function of the vehicle 10.

The input/output I/F 26 is an interface for communicating with an in-vehicle device 40 mounted on the vehicle 10.

The in-vehicle device 40 is various devices mounted on the vehicle 10. The vehicle 10 includes a detection unit 40A and a display unit 40B as an example of the in-vehicle device 40.

The detection unit 40A is a detection device capable of detecting the state of the vehicle 10 including inside and outside the vehicle. The detection unit 40A contains a camera, a vehicle speed sensor, a millimeter wave sensor, and a Global Positioning System (GPS) device as an example.

A camera as the detection unit 40A is, for example, an imaging device that performs imaging using an imaging element such as a Charge Coupled Device (CCD) image sensor or a Complementary Metal Oxide Semiconductor (CMOS) image sensor. The camera is provided in the front part of the vehicle 10 and images the front of the vehicle. The image captured by the camera is used, for example, to recognize the inter-vehicle distance from a preceding vehicle traveling in front of the vehicle, lanes, and objects present in front of the vehicle. Images captured by the camera are stored in the storage unit 24. Note that the camera may be configured as an imaging device for other uses such as a drive recorder and an Advanced Driver Assistance System (ADAS). Moreover, the camera may be connected to the vehicle-mounted device 20 via the ECU 30 (for example, camera ECU).

A vehicle speed sensor as the detection unit 40A is a sensor for detecting the vehicle speed of the vehicle 10, and is provided, for example, in the wheels.

A millimeter wave sensor as the detection unit 40A is a sensor for detecting a target object existing in front of the vehicle, that is, in the traveling direction of the vehicle 10, and is provided at least in the front portion of the vehicle 10. The millimeter wave sensor is used to detect a target object by transmitting a transmission wave forward of the vehicle 10 and receiving a reflected wave from an object in front. Here, the target object is, for example, a pedestrian, a bicycle, a wall, an oncoming vehicle, or any other object that may pose a danger to the running of the vehicle 10. Note that the object to be the target object may be registered in the vehicle 10 in advance, or may be registered by input from the passenger. Moreover, it is desirable that the object to be the target object can be updated such as deletion and addition automatically by the vehicle-mounted device 20 or based on the input of the occupant. Hereinafter, in this embodiment, the target object is assumed to be a pedestrian as an example.

A GPS device as the detection unit 40A is a device that detects the current location of the vehicle 10. The GPS device includes an antenna (not shown) that receives signals from GPS satellites. The GPS device may be connected to the vehicle-mounted device 20 via a car navigation system connected to the ECU 30 (for example, a multimedia ECU).

The display unit 40B is an in-vehicle display for displaying an operation suggestion related to the function of the vehicle 10, an image related to the description of the function, and the like. The display unit 40B is provided on a meter panel as an example.

A wireless communication I/F 27 is a wireless communication module for communicating with the outside. The wireless communication module uses communication standards such as 5G, LTE, Wi-Fi (registered trademark), for example.

Figure 2:
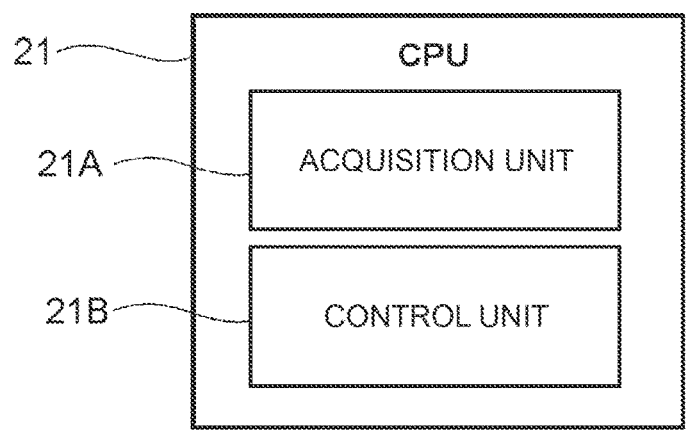
FIG. 2 is a block diagram showing an example of the functional configuration of the vehicle.

Next, the functional configuration of the vehicle 10 will be described. FIG. 2 is a block diagram showing an example of the functional configuration of the vehicle 10. As shown in FIG.

As shown in FIG. 2, the CPU 21 of the vehicle-mounted device 20 has an acquisition unit 21A and a control unit 21B as functional configurations. Each functional configuration is realized by the CPU 21 reading out the information processing program 24A stored in the storage unit 24 and executing it.

The acquisition unit 21A periodically acquires detection information detected by the detection unit 40A while the vehicle 10 is running. The detection information includes, for example, an image captured by a camera and detection results detected by a vehicle speed sensor, a millimeter wave sensor, and a GPS device.

The control unit 21B controls the display content of the display unit 40B based on the detection information acquired by the acquisition unit 21A. For example, while the vehicle 10 is traveling, based on the detection information, the control unit 21B can display, on the display unit 40B, a vehicle image 50 showing the vehicle 10, a road image 52 showing the road on which the vehicle 10 is traveling, and a target object image 54 showing the target object (see FIGS. 5 and 6).

FIG. 3 is a first flowchart showing the flow of control processing in which the vehicle-mounted device 20 controls the display content of the display unit 40B. Control processing is performed by the CPU 21 reading out the information processing program 24A from the storage unit 24, developing it in the RAM 23, and executing it. As an example, the control process shown in FIG. 3 is periodically executed while the vehicle 10 is running.

In S10 shown in FIG. 3, the CPU 21 acquires detection information detected by the detection unit 40A. Then, the CPU 21 proceeds to S11.

At S11, the CPU 21 causes the display unit 40B to display the vehicle image 50 and the road image 52 based on the detection information acquired at S10. Specifically, the CPU 21 causes the vehicle image 50 to be displayed at a position reflecting the actual position of the vehicle 10 in the road image 52. For example, when the vehicle 10 is traveling on the left side of the road, the CPU 21 displays the vehicle image 50 on the left end of the road image 52. Then, the CPU 21 proceeds to S12.

In S12, the CPU 21 determines whether or not the display condition is satisfied based on the detection information acquired in S10. Here, when the CPU 21 determines that the display condition is satisfied (S12: YES), the process proceeds to S13. On the other hand, if the CPU 21 does not determine that the display condition is satisfied (S12: NO), it ends the control process. In this embodiment, the CPU 21 determines that the display condition is satisfied, when a target object existing in the traveling direction of the vehicle 10 is detected by the detection unit 40A, and it is assumed that the positional relationship between the vehicle 10 and the target object is in a predetermined state, and the target object crosses the road. Here, when the positional relationship between the vehicle 10 and the target object is in a predetermined state, the relative collision time divided by the relative speed between the vehicle 10 and the target object, the so-called Time to Collision (TTC), is less than or equal to a predetermined value. The CPU 21 calculates the TTC between the vehicle 10 and the target object using the distance and relative speed between the vehicle 10 and the target object as the detection result of the millimeter wave sensor, which is the detection unit 40A. Also, when it is assumed that the target object crosses the road, the actual orientation of the target object faces the road. The CPU 21 uses a known image recognition technique to determine the direction of the body of the target object from the image captured by the camera, which is the detection unit 40A.

In S13, the CPU 21 causes the display unit 40B to display the target object image 54 based on the detection information acquired in S10. Specifically, the CPU 21 causes the target object image 54 to be displayed in the road image 52 at a position that reflects the actual position of the target object. For example, when the actual position of the target object is outside the road, the CPU 21 displays the target object image 54 at a position indicating the outside of the road in the road image 52. Then, the CPU 21 terminates the control process.

FIG. 4 is a second flowchart showing the flow of control processing. As an example, the control process shown in FIG. 4 is periodically executed when the target object image 54 is displayed on the display unit 40B.

In S20 shown in FIG. 4, the CPU 21 acquires detection information detected by the detection unit 40A. Then, the CPU 21 proceeds to S21.

In S21, the CPU 21 determines whether the target object is expected to cross the road based on the detection information acquired in S20. Here, when the CPU 21 determines that the target object is not expected to cross the road (S21: YES), the process proceeds to S22. On the other hand, if the CPU 21 does not determine that the target object is not supposed to cross the road (S21: NO), it ends the control process. Here, the case where the target object is not supposed to cross the road is the case where the actual orientation of the target object existing outside the road does not face the road. The CPU 21 uses known image recognition technology to determine the position of the target object and the orientation of the body from the image captured by the camera, which is the detection unit 40A.

In S22, the CPU 21 erases the target object image 54 from the display unit 40B. Then, the CPU 21 terminates the control process.

Next, a display example displayed on the display unit 40B as a result of the control processing shown in FIG. 3 or 4 being performed by the vehicle-mounted device 20 will be described.

FIG. 5 is a first explanatory diagram showing a display example displayed on the display unit 40B while the vehicle 10 is running. Specifically, FIG. 5 is a display example of the display unit 40B when the vehicle 10 is running on a straight road.

The display unit 40B shown in FIG. 5 displays a vehicle image 50 showing the vehicle 10 traveling in the direction of the arrow S, and a road image 52 showing the straight road on which the vehicle 10 travels. As an example, the vehicle image 50 is a substantially rectangular figure. In the road image 52, the area between the two straight lines is the inside of the road, and the outside of the two straight lines is outside the road.

In addition to the vehicle image 50 and the road image 52, the display unit 40B shown in FIG. 5 displays the target object image 54 when the CPU 21 determines that the display condition is satisfied. The target object image 54 reflects the actual position of the target object, and is displayed outside the road on the right side of the vehicle image 50 in the figure on the forward side in the traveling direction of the vehicle 10.

As an example, the target object image 54 is composed of a circular frame portion 54A and an icon 54B displayed within the frame portion 54A and indicating the type of the target object. In this embodiment, a plurality of types of icons 54B are provided, and the icon 54B selected by the CPU 21 based on the acquired detection information is displayed within the frame portion 54A. In FIG. 5, an icon 54B representing a pedestrian is displayed.

Here, the CPU 21 displays a target object image 54 reflecting the actual orientation of the target object. As an example, the display unit 40B shown in FIG. 5 displays the body of the pedestrian indicated by the icon 54B such that the body faces the road because the CPU 21 determined from the detection information that the body of the target object was facing the road (for example, the left side in the drawing).

FIG. 6 is a second explanatory view showing a display example displayed on the display unit 40B while the vehicle 10 is running. Specifically, FIG. 6 is a display example of the display unit 40B after a predetermined time has elapsed since the display example shown in FIG. 5 was displayed.

Here, the CPU 21 changes the vehicle image 50 and the road image 52 following changes in the actual position of the vehicle 10. Accordingly, in FIG. 6, the position of the vehicle image 50 has changed from that in FIG. 5 to the upper side in the drawing when the vehicle 10 travels along a straight road. Although not shown, when the vehicle 10 enters a curved road from a straight road, the CPU 21 changes the two straight lines of the road image 52 into two curved lines.

In addition, the CPU 21 changes the position of the target object image 54 to follow changes in the actual position of the target object. For example, although not shown, when a target object enters the road, the CPU 21 displays the target object image 54 inside the road indicated by the road image 52.

Here, in FIG. 6, the CPU 21 erases the target object image 54 from the display unit 40B as it determines that the target object is no longer expected to cross the road. As an example, the CPU 21 erases the target object image 54 because the direction of the body of the target object determined from the image captured by the camera, which is the detection unit 40A, is not facing the road.

As described above, in the vehicle-mounted device 20, the CPU 21 displays a target object image 54 in the road image 52 at a position that reflects the actual position of the target object, as a function of the control unit 21B, when the target object is detected by the detection unit 40A, and it is assumed that the positional relationship between the vehicle 10 and the target object is in a predetermined state, and the target object crosses the road. As a result, the vehicle-mounted device 20 displays the target object image 54 on the condition that the target object crosses the road, so that the vehicle-mounted device 20 can display, on the in-vehicle display, the content associated with the possibility that the target object crosses the road in reality.

Also, when it is assumed that the target object crosses the road, the actual orientation of the target object faces the road. As a result, the vehicle-mounted device 20 described above can determine the possibility of the target object crossing the road based on the actual orientation of the target object, and control whether to display the target object image 54.

In the vehicle-mounted device 20, the CPU 21, as a function of the control unit 21B, displays the target object image 54 reflecting the actual orientation of the target object. Accordingly, in the vehicle-mounted device 20, the occupant can grasp the actual orientation of the target object by looking at the display unit 40B.

Further, in the vehicle-mounted device 20, the CPU 21 displays the target object image 54 as a function of the control unit 21B, and then deletes from the display unit 40B the target object image 54 to the display unit when the target object is no longer expected to cross the road. As a result, in the vehicle-mounted device 20, the amount of information to be displayed on the display unit 40B can be reduced when the target object is no longer expected to cross the road.

In the vehicle-mounted device 20, the CPU 21 causes the vehicle image 50 to be displayed at a position reflecting the actual position of the vehicle 10 in the road image 52 as a function of the control unit 21B. Accordingly, in the vehicle-mounted device 20, the occupant can grasp the positional relationship between the vehicle 10 and the target object by looking at the display unit 40B.

OTHERS

In the above-described embodiment, the vehicle-mounted device 20 is used as an example of the information processing device, but the present disclosure is not limited to this. An external device such as a server that is not mounted on the vehicle 10 may be used as an example of the information processing device, and a combination of the external device and the vehicle-mounted device 20 may be used as an example of the information processing device. For example, when the combination of the vehicle-mounted device 20 and an external device is used as an example of an information processing device, at least part of each functional configuration of the CPU 21 of the vehicle-mounted device 20 shown in FIG. 2 may be performed by the CPU of the external device. In this case, the control processing shown in FIG. 3 or FIG. 4 is executed by one processor of the CPU 21 of the vehicle-mounted device 20 or the CPU of the external device, or a combination of a plurality of processors of the CPU 21 of the vehicle-mounted device 20 and the CPU of the external device.

In the above-described embodiment, the detection unit 40A includes a camera, a vehicle speed sensor, a millimeter wave sensor, and a GPS device, but the configuration of the detection unit 40A is not limited to this. For example, the detection unit 40A includes a millimeter wave sensor as a detection device that detects a target object existing in the traveling direction of the vehicle 10, but may include a laser imaging detection and ranging (LIDAR) instead of or in addition to the millimeter wave sensor, the lidar may be used to detect the target object.

In the above embodiment, the display unit 40B is provided on the meter panel, but the arrangement of the display unit 40B inside the vehicle is not limited to this. For example, the display unit 40B may be provided on an instrument panel, or configured as a HUD that illuminates the display surface of the front windshield.

In the above-described embodiment, the display unit 40B is a display device provided in the vehicle 10. However, the display unit 40B is not limited to this. A mobile terminal such as a smartphone of an occupant may be set in a vehicle, and the mobile terminal may be used as the display unit 40B.

In the above embodiment, the case where the positional relationship between the vehicle 10 and the target object is in the predetermined state is the case where the TTC between the vehicle 10 and the target object is equal to or less than a predetermined value, but the present disclosure is not limited to this. For example, another case, such as when the distance between the vehicle 10 and the target object is equal to or less than a predetermined value, may correspond to the case where the positional relationship between the vehicle 10 and the target object is in a predetermined state.

In the above embodiment, the case where the target object is assumed to cross the road is the case where the actual direction of the target object faces the road, but the present disclosure is not limited to this. For example, when it is assumed that the target object crosses the road, other cases such as when the target object raises its hand may be used.

In the above embodiment, the actual orientation of the target object to be reflected in the target object image 54 is appropriately determined according to the type of target object. For example, in the above-described embodiment, the target object is a pedestrian, so the orientation of the pedestrian's body is reflected in the target object image 54. When the target object is a bicycle, the orientation of the tire may be reflected in the target object image 54.

In the above embodiment, the case where the target object is not expected to cross the road is the case where the actual direction of the target object existing outside the road is not facing the road, but the present disclosure is not limited to this. For example, when the target object is not supposed to cross the road, other cases such as when the target object existing outside the road stays in place for a predetermined time or longer may be used.

Note that the control processing executed by the CPU 21 by reading the software (program) in the above embodiment may be executed by various processors other than the CPU. In this case, the processor is a Programmable Logic Device (PLD) whose circuit configuration can be changed after manufacturing, such as a Field-Programmable Gate Array (FPGA), and an Application Specific Integrated Circuit (ASIC) for executing specific processing. A dedicated electric circuit or the like, which is a processor having a specially designed circuit configuration, is exemplified. Also, the control processing may be executed by one of these various processors, or a combination of two or more processors of the same or different type (for example, a plurality of FPGAs, a combination of a CPU and an FPGA, etc.). Further, a hardware configuration of the various processors is, more specifically, an electric circuit in which circuit elements such as semiconductor elements are combined.

Further, in the above-described embodiment, the information processing program 24A is stored (installed) in advance in the storage unit 24, but the present disclosure is not limited to this. The information processing program 24A may be provided in a form recorded in a recording medium such as a Compact Disk Read Only Memory (CD-ROM), a Digital Versatile Disk Read Only Memory (DVD-ROM), and a Universal Serial Bus (USB) memory. Also, the information processing program 24A may be downloaded from an external device via a network.

What is claimed is:

1. An information processing device comprising one or more processors configured to:
   display a target object image showing a target object at a position reflecting an actual position of the target object in a road image showing a road and displayed on a display in a vehicle in a case where i) the target object present in a traveling direction of the vehicle traveling on the road is detected by a detector, ii) a positional relationship between the vehicle and the target object is in a predetermined state, and iii) the target object is expected to cross the road; and
   erase the target object image from the display in a case where the target object is no longer expected to cross the road after the target object image is displayed.

2. The information processing device according to claim 1, wherein the target object is expected to cross the road when an actual direction of the target object is a direction toward the road.

3. The information processing device according to claim 2, wherein the one or more processors are configured to display the target object image reflecting the actual direction of the target object.

4. The information processing device according to claim 1, wherein the one or more processors are configured to display a vehicle image showing the vehicle at a position reflecting an actual position of the vehicle in the road image.

* * * * *